(12) United States Patent
Arcot et al.

(10) Patent No.: US 12,535,942 B2
(45) Date of Patent: Jan. 27, 2026

(54) BLOWOUT PREVENTER SYSTEM WITH DATA PLAYBACK

(71) Applicant: Hydril USA Distribution LLC, Houston, TX (US)

(72) Inventors: Prakashkumar Arcot, Spring, TX (US); Thanh T. Nguyen, Spring, TX (US); Sudhakar Bhagavatula, Spring, TX (US); Jonathan Lim, Meadows Place, TX (US); John Holmes, Katy, TX (US)

(73) Assignee: Hydril USA Distribution LLC, Houston, TX (US)

( * ) Notice: Subject to any disclaimer, the term of this patent is extended or adjusted under 35 U.S.C. 154(b) by 0 days.

(21) Appl. No.: 16/925,047

(22) Filed: Jul. 9, 2020

(65) Prior Publication Data

US 2022/0011930 A1 Jan. 13, 2022

(51) Int. Cl.
*G06F 3/04847* (2022.01)
*E21B 33/035* (2006.01)
(Continued)

(52) U.S. Cl.
CPC ........ *G06F 3/04847* (2013.01); *E21B 33/064* (2013.01); *E21B 47/001* (2020.05);
(Continued)

(58) Field of Classification Search
None
See application file for complete search history.

(56) References Cited

U.S. PATENT DOCUMENTS

| 6,234,250 B1 * | 5/2001 | Green | E21B 47/10 175/65 |
|---|---|---|---|
| 10,000,987 B2 | 6/2018 | Springett | |

(Continued)

FOREIGN PATENT DOCUMENTS

| CN | 2727394 | 9/2005 |
|---|---|---|
| CN | 101118656 A | 2/2008 |

(Continued)

OTHER PUBLICATIONS

Jim Mckay; Clayton Simmons; Tony Hogg; Gavin Starling; Mike Doty; Allen Pere (Blowout Preventer (BOP) Health Monitoring, https://doi.org/10.2118/151182-MS) (Year: 2012).*

(Continued)

*Primary Examiner* — Gabriel Mercado
(74) *Attorney, Agent, or Firm* — Osha Bergman Watanabe & Burton LLP (57) ABSTRACT

A method for oil and gas analysis includes receiving measurements from sensing devices instrumented on a blowout preventer, the measurements generated by the plurality of sensing devices over time, storing the measurements in a database, providing a data playback interface to a client device, determining a time range based one or more inputs into the data playback interface, determining one or more data variables selected from a plurality of data variables based the one or more inputs retrieving, from the database, respective values of the one or more data variables corresponding to the time range, generating, one the display, a visual representation of the values of the one or more data variables corresponding to the time range, the visual representation providing playback of the values of the one or more data variables synchronized with respect to time, and displaying the values according to user manipulation of playback control elements.

17 Claims, 7 Drawing Sheets

(51) Int. Cl.
*E21B 33/064* (2006.01)
*E21B 47/001* (2012.01)
*E21B 47/047* (2012.01)
*E21B 47/06* (2012.01)
*E21B 47/07* (2012.01)

(52) U.S. Cl.
CPC ......... *E21B 33/0355* (2013.01); *E21B 47/047* (2020.05); *E21B 47/06* (2013.01); *E21B 47/07* (2020.05)

(56) References Cited

U.S. PATENT DOCUMENTS

| | | | |
|---|---|---|---|
| 10,113,408 B2 | 10/2018 | Pobedinski | |
| 10,301,923 B2* | 5/2019 | Andresen | E21B 44/00 |
| 10,392,918 B2 | 8/2019 | Harkless | |
| 10,539,010 B2* | 1/2020 | Gutierrez | E21B 41/0007 |
| 10,684,721 B2 | 6/2020 | Homma | |
| 2007/0146491 A1* | 6/2007 | Tremblay | G06F 18/40 |
| | | | 348/211.99 |
| 2009/0006271 A1* | 1/2009 | Crowder | G06Q 40/04 |
| | | | 705/36 R |
| 2010/0156830 A1 | 6/2010 | Homma | |
| 2011/0173193 A1* | 7/2011 | Ahn | G06F 16/2428 |
| | | | 707/765 |
| 2011/0174477 A1* | 7/2011 | Verma | E21B 29/06 |
| | | | 166/55.7 |
| 2012/0304110 A1* | 11/2012 | Chmiel | G06Q 10/0639 |
| | | | 715/781 |
| 2014/0166264 A1 | 6/2014 | Judge et al. | |
| 2014/0231075 A1 | 8/2014 | Springett et al. | |
| 2016/0053604 A1 | 2/2016 | Abbassian et al. | |
| 2016/0326856 A1* | 11/2016 | Wise | G06F 30/20 |
| 2017/0255192 A1* | 9/2017 | Thwaites | E21B 44/00 |
| 2019/0018160 A1 | 1/2019 | Habboosh | |
| 2022/0229416 A1* | 7/2022 | Shigemori | G05B 19/4069 |

FOREIGN PATENT DOCUMENTS

| | | |
|---|---|---|
| CN | 110325705 A | 10/2019 |
| JP | 2011-071584 | 4/2011 |

OTHER PUBLICATIONS

Dalgliesh et al., "Artificial Intelligence-Driven Timelines Help Optimize Well Life Cycle," Feb. 1, 2020, JPT Technology, vol. 72, Issue: 2, 3 pages.
GE Oil & Gas, "SeaLytics BOP Advisor Software," 2015, 2 pages.
International Search Report and Written Opinion mailed Oct. 26, 2021 in corresponding PCT Application No. PCT/US2021/070822.
Office Action issued in counterpart Chinese Patent Application No. 202180047657.1 mailed on May 17, 2025 (21 pages).

* cited by examiner

| ∨ FILTER 304 | | | | 306 | | 308 | | PLAYBACK 302 |
|---|---|---|---|---|---|---|---|---|
| START TIME | | | | END TIME | | EVENT TYPE | | |
| 11/17/2019 | 02:21 PM | | | 11/18/2019 | 02:21 PM | EVENTS ∨ | APPLY | |

∨ SELECT VARIABLES (MAXIMUM 5) FOR PLAY BACK     CREATE PLAYBACK   REMOVE PLAYBACK

| | | DESCRIPTION 🔍 | 310 |
|---|---|---|---|
| VARIABLE ID | DESCRIPTION | | |
| 9 | POD MATCH | | ☐ |
| 16 | POD 1 FLOW METER-TOTAL 1 | | ☐ |
| 7 | POD 2 FLOW METER-TOTAL 1 | | ☐ |
| 45 | ALARM LAMP | | ☐ |
| 47 | ALARM HORN | | ☐ |
| 57 | NODE 8-DP-TP-PANEL, DRILLER'S PROC. #2-ONLINE(0)/OFFLINE(1) | | ☐ |
| 59 | NODE 10-DP-TP-PANEL, TOOLPUSHER'S PROC. #2-ONLINE(0)/OFFLINE(1) | | ☐ |
| 60 | NODE 11-DIVERTER I/F PANEL PROCESOR-ONLINE (0)/OFFLINE(1) | | ☐ |
| 63 | DRILLER'S SOFTWARE PROGRAM, DP-TP PROC. #1-ONLINE(0)/OFFLINE (1) | | ☐ |
| 64 | DRILLER'S SOFTWARE PROGRAM, DP-TP PROC. #2-ONLINE(0)/OFFLINE(1) | | ☐ |

FIRST [<] 1 OF 68 [>] LAST

BLOWOUT PREVENTER SYSTEM WITH DATA PLAYBACK

BACKGROUND OF THE INVENTION

1. Field of the Invention

Embodiments disclosed herein relate generally to subsea oil and gas drilling systems. In particular, embodiments disclosed herein are related to data playback and visualization for subsea oil and gas drilling systems.

2. Brief Description of Related Art

Subsea drilling for oil and gas typically involves the use of a vessel, which can be, for example, a drill ship or a platform, on the surface of the sea, with a riser extending to near the sea floor. The bottom end of the riser is attached to a lower marine riser package, which contains, among other things, control pods intended to control components of the drilling system near the sea floor. Below the riser is typically positioned a stack, which includes a lower marine riser package and a lower stack. The lower stack includes a blowout preventer (BOP) mounted to a wellhead. The drilling pipe extends from the vessel at the sea surface, through the riser to the bottom of the sea, through the BOP, and through the wellhead into a wellbore to the oil producing formation. A BOP is a specialized valve or similar mechanical device, used to seal, control and monitor oil and gas wells to prevent blowouts, the uncontrolled release of crude oil or natural gas from a well. BOPs are critical to monitoring and maintaining well integrity.

During subsea drilling operations, various events may occur, such as an emergency disconnect sequence, a diverter packer close sequence, wellbore leaks, differential pressures across rams, and various testing events. When such an event occurs, operators want to obtain information about the factors that may have lead up to the event or occurred as a result of the event, so as to be able to improve future operations.

SUMMARY OF THE INVENTION

One aspect of the present technology provides a subsea oil and gas operation analysis system. The system includes a blowout preventer instrumented with a plurality of sensing devices, the sensing devices generating respective measurements over time, a database storing data obtained from the measurements, a display comprising a user interface, and at least one processing device. The at least one processing device has access to instructions that, when executed by the at least one processing device, cause the system to: receive one or more user inputs via the user interface, determine a time range based on the one or more user inputs, determine one or more data variables based on the one or more user inputs, obtain, from the database, respective values of the one or more data variables corresponding to the time range, generate, one the display, a visual representation of the values of the one or more data variables corresponding to the time range, the visual representation providing playback of the values of the one or more data variables synchronized with respect to time, and provide, via the display, a data playback control element, wherein playback of the values of the one or more data variables is controlled via received user manipulation of the data playback control element.

In some embodiments, the one or more user inputs includes a start time and an end time, and the time range is determined based on the start time and end time. In some embodiments, the one or more user inputs includes a selection of an event from a list of available events, and the time range is determined based on the selected event. In some embodiments, the one or more data variables are automatically determined based on the selected event. In some embodiments, the one or more data variables include the measurements generated by at least some of the plurality of sensing devices. In some embodiments, at least some of the one or more data variables are calculated based on measurements generated by at least some of the plurality of sensing devices. In some embodiments, the data playback control element includes a slider movable between a beginning of the time range and an end of the time range, wherein playback of the values of the one or more data variables is controlled by the position of the slider. In some embodiments, the visual representation of the values includes respective graphs of the one or more data variables superimposed with each other. In some embodiments, the one or more data variables include one or more of a state of a component of the blowout preventer, a state of an operation, or a sensor measurement. In some embodiments, the instructions, when executed by the at least one processing device, further cause the system to: determine a second time range based on the one or more user inputs, obtain, from the database, respective values of the one or more data variables corresponding to the second time range, and generate, on the display, a visual representation of the values of the one or more data variables corresponding to the second time range, the visual representation of the values of the one or more data variables corresponding to the second time range stacked with the visual representation of the values of the one or more data variables corresponding to the time range.

In another example embodiment, a subsea oil and gas operation analysis system includes a database storing data generated based on measurements made by a plurality of sensing devices implements on a blowout preventer, a display comprising a user interface, and at least one processing device having access to instructions that, when executed by the at least one processing device, cause the system to: receive one or more user inputs via the user interface, determine a time range based on the one or more user inputs, determine one or more data variables based on the one or more user inputs, obtain, from the database, respective values of the one or more data variables corresponding to the time range, generate, one the display, a visual representation of the values of the one or more data variables corresponding to the time range, the visual representation providing playback of the values of the one or more data variables synchronized with respect to time, and provide, via the display, a data playback control element, wherein playback of the values of the one or more data variables is controlled via received user manipulation of the data playback control element.

In some embodiments, the one or more user inputs includes a selection of an event from a list of available events, and the time range is determined based on the selected event. In some embodiments, the one or more data variables are automatically determined based on the selected event. In some embodiments, the one or more data variables include one or more of a state of a component of the blowout preventer, a state of the operation, or a sensor measurement. In some embodiments, the instructions, when executed by the at least one processing device, further cause the system to: determine a second time range based on the one or more user inputs, obtain, from the database, respective values of the one or more data variables corresponding to the second time range; and generate, on the display, a visual representation of the values of the one or more data variables corresponding to the second time range, the visual representation of the values of the one or more data variables corresponding to the second time range stacked with the visual representation of the values of the one or more data variables corresponding to the time range.

According to yet another embodiment, a method for subsea oil and gas operation analysis includes receiving measurements from a plurality of sensing devices instrumented on a blowout preventer, the measurements generated by the plurality of sensing devices over time, storing the measurements in a database, providing a data playback interface to a client device, wherein the data playback interface includes one or more user input elements and a data playback control element, determining a time range based one or more inputs into the data playback interface, determining one or more data variables selected from a plurality of data variables based the one or more inputs retrieving, from the database, respective values of the one or more data variables corresponding to the time range, generating, one the display, a visual representation of the values of the one or more data variables corresponding to the time range, the visual representation providing playback of the values of the one or more data variables synchronized with respect to time, receiving user manipulation of the data playback control element, and displaying the values according to the user manipulation.

In some embodiments, the method further includes receiving a start time and an end time entered into the user interface, and determining the time range based on the start time and the end time. In some embodiments, the method further includes receiving an event selected at the user interface, and determining the time range based on the event. In some embodiments, the method further includes receiving an event selected at the user interface, and determining the one or more data variables based on the event. In some embodiments, the method further includes determining a second time range based on the one or more user inputs, obtain, from the database, respective values of the one or more data variables corresponding to the second time range; and generating, on the display, a visual representation of the values of the one or more data variables corresponding to the second time range, the visual representation of the values of the one or more data variables corresponding to the second time range stacked with the visual representation of the values of the one or more data variables corresponding to the time range.

BRIEF DESCRIPTION OF THE DRAWINGS

The present technology can be better understood on reading the following detailed description of nonlimiting embodiments thereof, and on examining the accompanying drawings, in which.

DETAILED DESCRIPTION

The foregoing aspects, features, and advantages of the present technology can be further appreciated when considered with reference to the following description of preferred embodiments and accompanying drawings, wherein like reference numerals represent like elements. The following is directed to various exemplary embodiments of the disclosure. The embodiments disclosed should not be interpreted, or otherwise used, as limiting the scope of the disclosure, including the claims. In addition, those having ordinary skill in the art can appreciate that the following description has broad application, and the discussion of any embodiment is meant only to be exemplary of that embodiment, and not intended to suggest that the scope of the disclosure, including the claims, is limited to that embodiment.

The present disclosure provides visual reconstruction of event data for BOP operations, allowing operators to replay and visualize multiple data variables as a function of time.

The below description provides an overview of the systems of the present technology. In it, the subsystems included in the technology identified, and a high level description of each subsystem is provided. This description also describes system level interfaces between the subsystems, and external components required for proper BOP functionality within the system.

In the application, the acronyms and abbreviations used to describe the present technology can have the following meanings:

ASTS—Auxiliary Stack Test System
BPCS—Basic Process Control System
BOP—Blowout Preventer
BSR—Blind Shear Ram
C&K—Choke and Kill
CBM—Condition Based Maintenance
CCU—Central Control Unit
CP—Cathodic Protection
CSR—Casing Shear RAM
EDS—Emergency Disconnect Sequence
ERA—Electronic Riser Angle
FRU—Fluid Reservoir Unit
HMI—Human Machine Interface
HPHT—High Pressure High Temperature
HPTU—High Pressure Test Unit
HPU—Hydraulic Power Unit
HVR—Variable ram
I/O—Input/Output
Ksi—Thousands of pounds per square inch
LMRP—Lower Marine Riser Package
MTBR—Mean Time Between Repair
MUX—Multiplex
MWP—Maximum Working Pressure
psia_pounds per square inch absolute
RBOP—Ram Blowout Preventer
ROV—Remotely Operated Vehicle
SEM—Subsea Electronics Module
SIF—Safety Instrumented Function
SIL—Safety Integrity Level
SIS—Safety Instrumented System
SRS—Safety Requirements Specification In the application, the following terms have the following definitions:

Central Control Unit means cabinets that contain the computers which process the data and send control signals to other subsystems such as the subsea POD. The CCU typically have a Blue and Yellow designated cabinet for redundancy purposes.

Drillers Panel means the HMI terminal that is located near the moon pool on a drillship.

Emergency Disconnect Sequence means a programmed sequence of events that operates the functions to leave the stack and controls in a desired state and disconnect the LMRP from the lower stack.

Engineering Work Station means the HMI terminal to view BOP status information. The Engineering Work Station typically contains equipment for data logging.

Fluid Reservoir Unit mixes and stores hydraulic fluid concentrate, glycol and water to produce the hydraulic fluid which is supplied to the HPU for charging accumulator racks and operating hydraulic stack functions.

Hydraulic Pumping Unit supplies hydraulic fluid to charge both the surface and subsea accumulators from precharge pressure to the maximum system operating pressure.

Kick means an influx of formation liquids or gas into the wellbore. Without corrective measures, a kick can result in a blowout.

Lower Marine Riser Package means the portion of the stack where the annular BOPs and the subsea control system (POD) is mounted. The LMRP may disconnect from the lower stack via a hydraulic connector.

Lower Stack means the portion of the stack that sits between the wellhead and the LMRP. Typically this portion of the stack houses the ram BOPs, acoustic backup, and deadman systems.

POD means the subsea component that contains two SEMs, the subsea transformer, and the subsea hydraulic control valves.

Safety Integrity Level refers to the amount of risk reduction required from the safety instrumented system.

Safety Instrumented System is a system engineered to perform specific control functions to failsafe or maintain safe operation of a process when unacceptable or dangerous conditions occur.

Skid refers to the mechanical arrangement for certain subsystems on the ship.

Stack means the assembly that sits between the wellhead and the riser. The blowout prevention system is mounted to the stack. The stack consists of the lower stack and the LMRP.

Toolpushers Panel means an HMI terminal located on the drillship.

During drilling operations, the BOP is typically the secondary method of well control. The primary method of pressure control in a well generally consists of pressure control via weighted drilling mud using counter pressure techniques. Due to the uncertainty of reservoir pressures, however, which are estimated prior to commencing drilling, at times the weight of the drilling mud is insufficient to maintain control of the well. In such a condition, known in the industry as a kick, the BOP can protect the rig and the environment from the effects of the kick.

Figure 1:
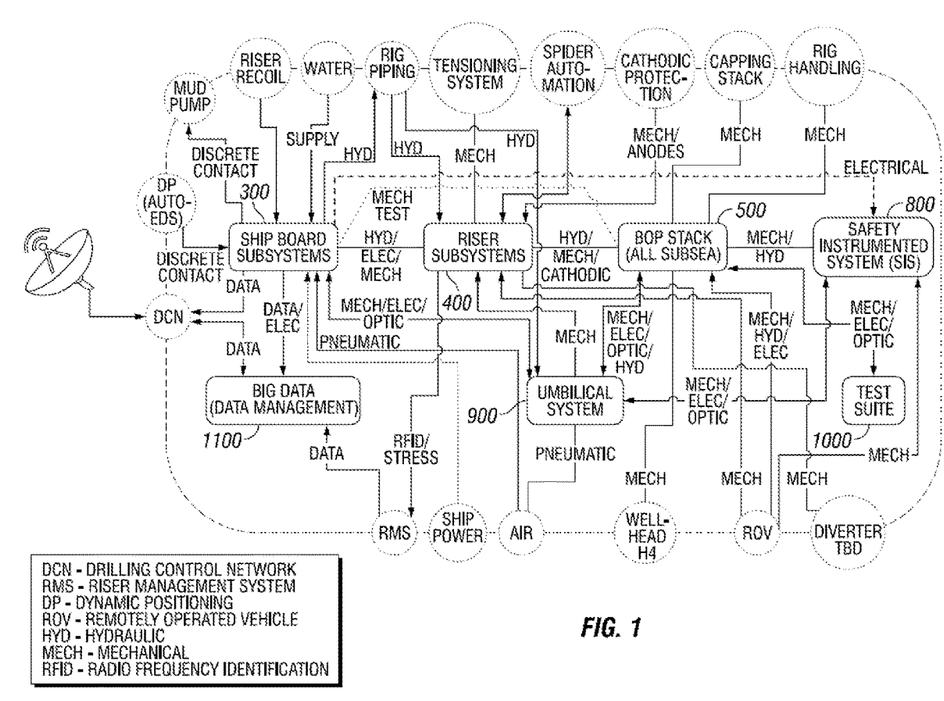
FIG. 1 illustrates top level subsystems of a BOP system, in accordance with example embodiments.

In the drawings, FIG. 1 depicts the top level subsystems. These include ship board subsystems 300, marine riser subsystems 400, BOP stack subsystem 500, including LMRP and lower stack, SIS subsystem 800, umbilical subsystem 900, test suite 1000, and big data subsystem 1100 (rig to cloud data management subsystem). In addition, some embodiments of the present technology include CBM technology, through which systems of the technology collect, correlate, and process data related to specific components or groups of components, and determine a use-based maintenance schedule more efficient than known time-based maintenance schedules.

As described in further detail below with respect to each subsystem, the shipboard subsystems 300 can include surface controls, a diverter skid and accumulator (designed to support the hydraulic needs of a diverter), an HPU and/or FRU and accumulator (designed to support the hydraulic needs of the HPU), power management components, as well as other components. The marine riser subsystem 400 can include an LMRP riser adapter, riser joints, riser tension rings, riser running tools (which can be hydraulic), manual running tools, and riser lifting tools. The marine riser subsystem can also include an automated riser management control system (RMS) capable of using radio frequency identification (RFID) techniques for each riser section to uniquely identify that section for the purpose of tracking is deployment (time subsea) and position in the riser string.

In addition, and as can be described in further detail below, the BOP stack subsystem 500 can include subsea controls and acoustic sensing housed within the stack frame. In some embodiments, the stack can accommodate the ability to be lifted vertically or horizontally from the ocean floor, and the frame surrounding and supporting the BOPs can provide the ability to mount acoustic sensors and the electronic controls to collect the data for transmission to the surface. The BOP stack subsystem 500 can also be equipped with a C&K subsystem, and can be designed to be ROV friendly by providing panels to allow an ROV the ability to read and/or collect data and actuate valves as a means of independent external control of certain functions.

In some embodiments, the SIS subsystem 600 can include a surface and subsea logic solver, as well as SIL rated hydraulic components to actuate the identified BOPs per SRS. The test suite 1000 can include an ASTS for conducting testing of an auxiliary stack on the deck of the ship, as well as an HPTU for testing the hydraulics on the riser string and BOP stack. Furthermore, the test suite 1000 can include a POD test station. In some embodiments, the big data subsystem 1100 can include two distinct levels of functionality. First, portions of the big data subsystem 1100 can reside on the drill ship in the form of a server providing a framework for hosting applications to meet customer needs and provide a portal for transmitting data to a cloud based data management system. Second, the big data subsystem 1100 can utilize cloud based data management services to provide operational data, such as component tracking.

According to certain embodiments of the technology, the top level functionality of the drilling system can include a BOP stack subsystem 500. In addition, the marine riser subsystem 400 can provide a connection between the surface drill ship and the BOP stack subsystem 400 components for the drilling equipment to be guided to the wellhead, and support the cabling and hydraulics for controls between surface and subsea subsystems.

In addition, in some embodiments, the BOP control system (surface & subsea) can allow a drilling operator the ability monitor and actuate the BOP stack subsystem 500 functionality. The umbilical subsystem 900 can provide high voltage power, hydraulic lines, and fiber optic communication cables. In addition, the umbilical subsystem 900 can be redundant with a Blue and Yellow designation that corresponds to common terminology in the field.

Furthermore, in some embodiments, the system can include new features to allow external monitoring of the BOP stack subsystem 500 using acoustics, and can also include an SIL rated backup control system to provide enhanced safety. To improve tracking of parts and enhance the ability to identify potential risk, a big data subsystem 1100 can be used. The big data subsystem 1100 can allow tracking of usage to ensure customer service is aware of pending equipment service and failure patterns. This system can identification of patterns to aid in addressing systemic design issues.

In some embodiments of the technology, the system can monitor the following conditions, among others:
FRU fluid levels (high and low)
Temperatures within surface control cabinets
Temperatures within the subsea SEM housing, power bus voltage (both AC and DC)
Solenoid voltage and current (e.g., a small trickle current can be monitored to indicate the solenoid coil isn't open circuit)
Water ingress in the SEM housing (An alarm message can be sent to the surface if the housing loses the 1 ATM pressure and water begins to fill the housing)
Well bore pressure & temperature
Surface accumulator pressure
Subsea manifold regulator pressure
Upper and lower annular regulator pressure
HPU Accumulator, Manifold and pump pressures and filtration (which can provide an indication that a filter is plugged)
Hydraulic flow to subsea components
ERAs on both ends of the riser
BOP Ram position and pressure
Hydraulic leaks and valve actuations in an acoustic detection subsystem.

At least a portion of these conditions can be monitored using pressure and temperature sensors that conform to an electrical interface in the range of about 4 to about 20 milliamps (mA).

Certain embodiments of the present technology can also include up to five or more SIFs. These can include: pipe ram BOP control, CSR BOP control, BSR BOP control, LMRP connector release, and EDS.

The systems of the present technology are advantageous over many known systems because they provide a number of different capabilities. For example, the system described herein is reliable, and can have an MTBR (scheduled or unscheduled) of up to about 365 BOP-days or more for the system of all subsea equipment. This is achieved in part by improving reliability by about 120% or more in some subsystems, including the umbilical subsystem 900, subsea electronic components, subsea hydraulic components, and C&K lines. Reliability improvements to other components are beneficial for improving MTBR. Further, the systems and subsystems of the present technology are designed to comply with applicable government and industry regulations and standards, such as those associated with the Bureau of Safety and Environmental Enforcement (BSEE), and American Petroleum Institute (API), and the International Electrotechnical Commission (IEC).

In addition, systems of the present technology are capable of achieving high levels of drilling availability for each function of the system, and to reduce running time and the time taken for maintenance. This is accomplished by implementing redundancy in strategic portions of the system, as described in further detail below. Furthermore, the systems of the present technology are designed so that the system design maintenance interval can be about 10 years or more.

Figure 2A:
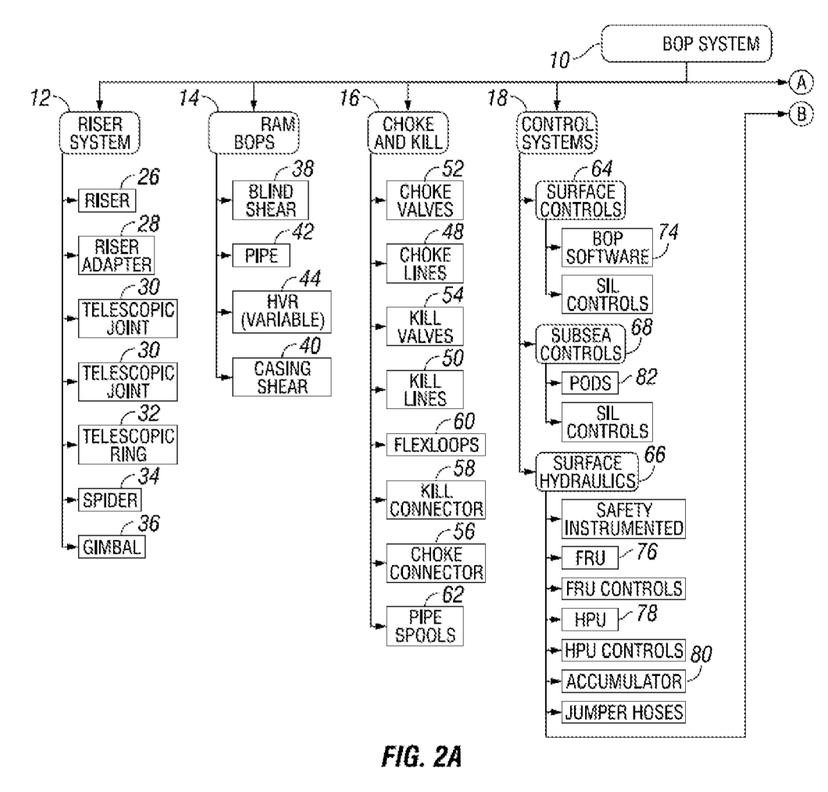
FIGS. 2A and 2B illustrate numerous additional subsystems of a BOP system, in accordance with example embodiments.
Figure 2B:
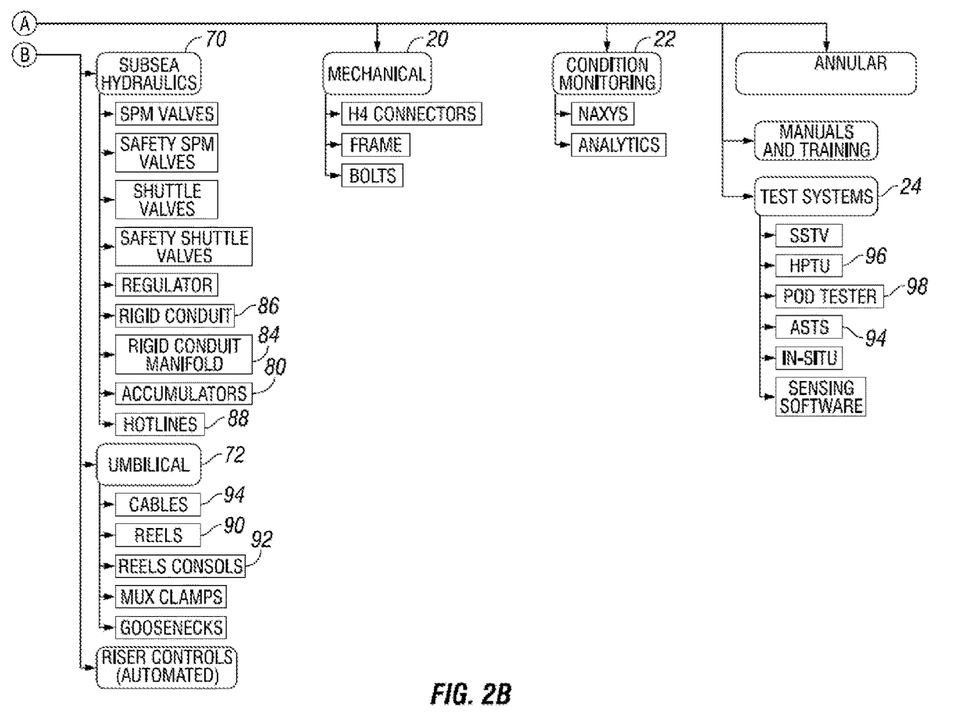

Overall System Architecture—FIGS. 2A and 2B

The BOP system 10 comprises numerous subsystems as identified in FIGS. 2A and 2B. For example, the BOP system 10 can consist of a riser components 12, multiple ram type BOPs 14, annular BOPs, C&K components 16, a control system 18, and, optionally, a subsea SIL solver with SIL rated valves. The BOP system 10 can be connected to the surface through a riser, two umbilical cables (containing fiber & copper), two rigid conduits, and a hot line. The BOP system 10 can contain electrical and hydraulic controls sufficient to close any of the ram BOPs or the annular BOPs on-demand. The BOP system 10 also includes mechanical components 20, condition monitoring components 22, and test components 24.

The riser components 12 provide the primary conduit between the surface and the wellhead equipment for drilling mud and drilled matter. Additionally, the riser components 12 support the weight of the BOP and LMRP during deployment and retrieval of these components, and can have a tension rating of up to about 4.5 million lbs. or more. The riser components 12 extend from the LMRP up to a diverter, and consist of the following: a riser 26, riser adapter 28, riser joints 30 (which can be slick and buoyant, and can be about 90 inches in length), various pup joints, C&K lines, a boost line, hydraulic lines (which can be duplex), a gas handler with a gas diversion line, telescopic joint interfacing, telescopic rings 32, a split tension ring, a termination ring, a spider 34, and a gimbal 36, as well as various running, handling, and maintenance tools.

In certain embodiments, the riser main tube can have a minimum inside diameter of about 19.25 inches below the telescopic joints. In addition, in many embodiments, the riser connection coupling make-up and disconnect does not require manual interface and can be completely automated for running and retrieval.

The ram type BOPs 14 can consist of one dual annular and a flex joint (which can have up to about a 6,000 lb. rating) at the top of the stack and supported by the LMRP frame. In some embodiments, there can be about eight ram type BOPs 14, which can comprise the BOP stack on the lower frame. The rams can include two or more BSRs 38, one or more CSR 40, and at least one pipe ram 42. In some cases, there may also be included an HVR 44.

The C&K components 16 are designed to allow a driller to circulate out a kick that is contained in the wellbore by a closed BOP. Once a kick has been detected, the mud weight must be increased to prevent further influx into the wellbore. At the same time, any influx of gas already in the well must be safely circulated out. A choke line 48 directs fluid out of the wellbore to what is known as a choke and kill manifold, located on the surface of the drilling vessel. There can be a variable choke valve on the surface that is controlled to maintain a safe circulation of any influx out of the well. A kill line 50 is used circulate fluid into the wellbore below a closed BOP. Using the kill line 50, a driller can add higher weight mud into the wellbore to stop any further influx from occurring.

Each cavity in the BOP can have an outlet for attaching either a choke line 48 or a kill line 50, depending on the BOP stack configuration, below the closed ram for that cavity. These choke lines 48 and kill lines 50 are isolated from the wellbore using what are known in the industry as C&K valves 52, 54, respectively. The C&K valves 52, 54 can be assembled on the BOP stack 14 and used to isolate the wellbore from the C&K lines 48, 50 during normal operations. In a kick scenario, two of these valves can be opened to allow flow into and out of the wellbore. In some embodiment, the valves can be a 3¹⁄₁₆" bi-directional double master C&K gate valves with a failsafe closed actuator and a failsafe open actuator. These valves are typically mounted to a 3¹⁄₁₆" or 4¹⁄₁₆" flange. The actuator can be powered by the same control system that controls the other functions on the BOP stack 14, utilizing the same operating fluid.

On the BOP stack, the C&K components 16 also consist of C&K connectors 56, 58, respectively, flexloop 60, and pipe spools 62. The C&K connectors 56, 58 are typically hydraulically extendable connections between the C&K lines 48, 50 on the LMRP and the lower stack. Since the LMRP is separately retrievable from the lower stack, a connector is required to enable the separation. The flexloop 60 provides a flexible conduit for connecting the C&K lines 48, 50 from the top of the fixed BOP stack to the riser adapter, which is allowed to move. Because the BOP stack is anchored to the seafloor, but the vessel is free to move on the surface, motion in the riser 26 must be allowed relative to the BOP stack 14. The flexloop 60 is used to allow this motion, which typically allows up to about 10 degrees of motion between the BOP stack 14 and the riser 26 in any direction. The flexloop 60 line is typically either rigid pipe bent into a loop or reinforced elastomeric hoses. The pipe spools 62 can be straight tubular members with flanges on each end to connect to the flexloop 60, C&K valves 52, 54, BOP stack 14, C&K connectors 56, 58, etc.

The control system 18 of the BOP system 10 can be broken into distinct pieces, including surface controls 64, surface hydraulic controls 66, subsea controls 68, subsea hydraulic controls 70, and umbilical controls 72.

The surface controls 64 can include software 74, developed using software modeling tools specific to generate executables targeting the known controllers and IO frameworks. The dual redundant CCUs (Blue & Yellow), discussed in greater detail below, are the focal point for the system control communication in the surface controls 64, and act as two of several HMIs. All data, including function commands from any surface control HMI, the associated responses from targeted system components, and system status updates, pass to the CCU, which in turn directs the data to the appropriate system components, as well as an engineering workstation for historical recordation.

The Engineering Work Station (EWS) (not shown) is the primary interface to the control systems 18 software. The cabinet mounted processor is capable of monitoring and printing alarms, errors, and events generated by the control system software as well as maintenance/diagnostics, system set up, and administrative capabilities.

The HPU interface panel (not shown) operates the hydraulic fluid mixing skid, controls up to three quintuplex pumps on the pumping skid, monitors surface accumulator and manifold pressures and controls electric actuators, which operate the open/close functions for the surface accumulator isolator valve, the blue and yellow hot line valves, and the rigid conduit valve.

The diverter control system interface panel (not shown) allows the diverter to be operated remotely from the CCU, driller's panel, or toolpusher's panel, and allows for communication between the system controllers and the diverter interface panel remote inputs and outputs.

The electrical distribution subsystem (not shown) includes redundant (Blue & Yellow) CCUs, and an uninterruptible power supplies (UPS) (not shown), a power distribution panels (PDPs) (not shown). The UPS isolates filters and regulates impure and erratic input power, as well as produces a reliable, consistent, pure sine wave output. The UPS can provide power to the control system 18 for a minimum of at least about two hours if loss of input power occurs. The PDPs provide power selectivity, protection, and coordination for the surface controls 64. Each PDP can receive power on two independent buses from two separate UPS sources, and can coordinate distribution to individual control sub-systems.

Some embodiments of the present technology can include a SIS panel, which can be a surface based logic controller that provides safety system control communication to the control systems 18. The SIS panel can have pushbutton functionality, and can provide illuminated indication to the operator for SIS events. Data, including function safety commands to subsea components, can originate from this panel. In addition, the associated responses from targeted system components, and system status updates, can be passed back to this panel.

In some embodiments, the remote display panel (not shown) can serve as the primary operator's station for the control systems 18. The remote display panel can be rated for use in hazardous areas, and can consist of a touchscreen driven by a board computer therein. The remote display panel can serve as several HMI options for controlling the control systems 18.

The surface hydraulic controls 66 can be responsible for filtering, mixing, pressurizing, storing, and distributing the control fluid that is used subsea and elsewhere on the rig for BOP operation and testing. The rig supplies potable water, concentrate, and glycol for use in the control fluid. The potable water can pass through a series of filtration and UV cleaning system components to bring the water to the concentrate manufacturer's recommended cleanliness prior to supplying the water to an FRU 76.

The FRU 76 mixes and stores hydraulic fluid concentrate, glycol, and water to produce the hydraulic fluid the supplies an HPU 78. The mix ratio of the fluid can be adjustable to match the manufacturer's recommended mix ratio. The control fluid can be stored in an unpressurized tank that feeds the HPU 78.

The HPU 78 can supply hydraulic fluid to charge both surface and subsea accumulators 80 from precharge pressure to a maximum system operating pressure which, in some embodiments, can be about 5,000 psi. This stored fluid can be used to operate all hydraulic functions in the LMRP and lower BOP stack.

The accumulators 80 can be charged with BOP control fluid by the HPU 78 from pre-charged pressure up to the system's operating pressure. The control fluid can then be discharged to the subsea hydraulic controls 66 via the rigid conduits on the riser and/or the hotline of the umbilical subsystem.

The subsea controls 68 can include electronic/electric and hydraulic controls for the purpose of monitoring and controlling the BOP stack 14. The subsea controls 68 can provide a reliable means to control the activation of the C&K valves and the BOPs (including rams and annulars), as well as other loads.

In addition, the subsea electronics can communicate with the surface controls 64 via fiber optic cables. Using fiber to communicate allows higher transmission rates required for the continuous monitoring subsystem, as well as greater immunity to electromagnetic interference. Control communications can be made independent of non-critical communications by routing the control communications through separate fibers. In some embodiments, the system may be installed on a fiber connected, copper connected, or fiber with copper backup connected system.

The SEM and the subsea hydraulic controls can be major subsystems of the subsea POD 82. The SEMs can provide the ability to collect and transmit data (e.g., pressure, temperature, flow rate, and ram position) to the surface control subsystem, as well as the electric actuation of pilot valves through solenoids. There can be two fully redundant SEM units within each POD 82. In addition, subsea hydraulic controls can include pilot valves, shuttle valves, lines, SPM valves, and accumulator bottles. The accumulator bottles can provide the hydraulic fluid/pressure necessary to actuate a BOP.

The architecture of the subsea controls 68 can also include a new concept of encapsulating the power and communications into a common hub to serve as a source decoupled from the SEMs. This embodiment can deploy redundant hubs, including two on the LMRP and two the lower stack. This design can be advantageous because it can reduce (or eliminate) future redesigns of the SEM POD 82 if the need arises for additional power or communications. In some embodiments, the subsea controls 68 design (as well as the surface controls 64 design) can include an independent subsea logic solver (and/or IO extension) as part of the overall SIS to provide additional subsea safety controls.

The subsea hydraulic controls 70 are at least partially responsible for receiving control fluid from the surface hydraulic controls 66, and distributing that fluid to the hydraulic functions on the LMRP and Lower Stack. The subsea hydraulic controls 70 can include a rigid conduit manifold supplied with control fluid from rigid conduits 86 (blue and yellow) and/or the hotlines 88. Rigid conduit manifold regulators (not shown) can regulate (as necessary), and distribute the control fluid to the appropriate pod and to the subsea accumulators 80. The rigid conduit manifold 84 can be piped in such way that either rigid conduit 86 can supply either pod with complete redundancy.

The hydraulic section of the subsea pod typically receives control fluid from the rigid conduit manifold 84, regulates the fluid to the proper pressures, and distributes the fluid to the appropriate functions on the LMRP and Lower Stack. The pods can contain flow meters to measure flow as functions are actuated, as well as pressure transducers to measure the pressures of selected functions and sources.

The subsea accumulators 80 can supply pressurized control fluid for the subsea backup systems, e.g. autoshear/deadman, acoustic pod, ROV intervention, and SIL pod. These accumulators 80 can be supplied pressure from the surface, or can be recharged with an ROV.

The subsea hydraulic controls 70 can contain a deadman/autoshear system (not shown). The deadman/autoshear system is designed to shut in the well in the event that both pods lose all hydraulic supply and electrical communications from the surface. The function of the autoshear is to shut in the well if there is an unplanned separation of the LMRP from the Lower Stack. The deadman/autoshear can close the CSRs 40 and then the BSRs 38 after a delay. These systems are passive, can stay armed once they are armed, and can have read back showing their arm/disarmed state at a given time.

The autoshear system (not shown) is a safety feature that can automatically close one set of shear rams if hydraulic pressure communication between the pod and the receiver manifolds is interrupted when the system is in the armed state. Hydraulic pressure losses can occur, for example, during unplanned LMRP disconnects or pod stab retractions.

The autoshear system can be made up of two hydraulic circuits, including the pod-mounted autoshear circuit, and the stack-mounted autoshear circuit. The stack-mounted autoshear/deadman valve assembly can include a dual SPM valve, consisting of an arm/disarm valve and a trigger valve. The arm/disarm valve can be dual piloted, and have a pilot-operated check valve (POCV) on the arm circuit pilot line to help maintain the valve in the armed (OPEN) position. The valve can also have a so-called "stay put spool" that can make sure the valve stays in its last known position if the POCV were to fail. During normal operation, the trigger valve can be held closed with pilot pressure, and primarily uses springs to fail open upon loss of pilot pressure to close a shear ram in an autoshear/deadman event. This valve, however, has additional redundancy, and can also be designed to fail open in the event both valve springs are damaged. At the input port of each autoshear dual SPM valve, an orifice fitting can be installed to reduce water hammer effects on the system.

Embodiments of the present technology also allow the circuit to function as a "deadman" circuit. If hydraulic pressure and electrical communication is interrupted to both pods, the pod-mounted autoshear circuit can activate the stack-mounted autoshear valves. This can result in the closure of the BSRs if the autoshear/deadman is armed. In addition, according to some embodiments, the acoustic pod backup system can consist of several critical functions that can be controlled remotely using an acoustic package.

In some alternate embodiments, the subsea hydraulic controls 70 can allow for ROV intervention, such as to control critical functions, isolate defined potential leak points, and/or provide visual read backs (e.g., via gauges, position indicators, etc.).

The umbilical controls 72 can provide the ability to deploy dual cables (Blue & Yellow designation) in a synchronized control. In addition, the Umbilical controls 72 can include synchronization of a hydraulic "Hotline" reel. The synchronized controls can allow for automated deployment and retrieval of the umbilical.

The umbilical controls 72 can include controls for cable reels 90. In certain embodiments, each cable reel 90 and frame can be fabricated from carbon steel, and coated with a three-coat protective coating system. The cable reels 90 can be painted in accordance with the Blue and Yellow designations to provide a visual connection to the subsea pod for which they are attached. The cable reels 90 can also include heavy-duty pillow block bearings, an air motor and level wind drive system, a disc brake system, a slip-ring assembly and an interface junction box. Furthermore, the cable reels 90 can be equipped with drum mounted disc brake calipers that are controlled from a reel control console 92. A housing can be included to cover the brake shoes and the stainless steel brake rotor, in order to provide protection from the elements in the environment.

In addition to the above, in some embodiments, a removable level wind system can be included, and can be mounted to the front of the cable reel 90. It can be driven by the rotation of the cable reel 90. The level wind assembly can consist of a stainless steel drive shaft (Archimedes screw) supported by flanged bearings, a manually actuated override clutch for synchronization of the level wind with the cable position, and a traveling carriage. The traveling carriage can be equipped with resilient rollers that control the MUX cable 94 being spooled out from the cable reel 90 and support structure. The traveling carriage can also be self-reversing, and, once installed, can be synchronized with the point of exit/entry of the cable-to-reel drum.

Each reel 90 can be fitted with a heavy-duty slip-ring assembly that is manufactured to explosion proof standards. The slip rings can be red brass with two copper-graphite brushes per ring. Signal transfer through the slip rings can be via two contacts per slip ring, although operation and control can be maintained with only one contact working. The slip-ring housing can be manufactured from stainless steel, and can be flange mounted into the main cable reel 90 shaft. In addition, the cable reel 90 can be equipped with an increased safety junction box for slip ring-to-MUX cable termination. Furthermore, air controls can be housed in a stainless steel cabinet mounted on the cable reel 90 structure. This cabinet can contain air valves that drive the cable reel motor and the disc brake system.

According to some embodiments of the present technology, the test components 24 can use a UPS source. The UPS can be designed to provide power conditioning and a battery powered back-up supply in the event of main power supply failure (drill ship generators). The power distribution unit within the UPS cabinet can distribute power to the following entities: 1) the ASTS 94 CCU cabinet, 2) remote display panels, 3) the pod test junction box, and 4) the HPTU 96.

According to some embodiments of the present technology, the ASTS 94 provides the ability to test all functionality (both electronic & hydraulic) on an auxiliary BOP stack as it resides on the deck of the drill ship. The ASTS 94 can issue commands and monitor all BOP functions to test the spare stack before being deployed subsea. The ASTS 94 can track all usage of identified components (e.g., valves, rams, annulars) to provide the data required for monitor stack usage. The test operator can interface with the ASTS 94 through a multi-purpose HMI. The ASTS 94 can have the ability to test the BOP stack with one or both subsea pods installed.

The hydraulic power for the test can be supplied by the same HPU 78 that supplies the BOP stack 14 during drilling operations. The HPU 78 and associated fluid system can provide adequate barriers and flexibility between the two BOPs (i.e., the test BOP and the BOPs in the stack) to ensure that the primary system is compliant with all relevant regulations and specifications at all times.

In addition to testing the BPCS functionality, the ASTS 94 can also provide testing of the subsea SIS functionality and defined interface between the two subsystems. The logic solver to be used by the ASTS 94 can be at least SIL level 1 capable.

The HPTU 96 can be designed to provide test pressure for the BOP, C&K lines 48, 50, boost line, and rigid conduits 86. The HPTU 96 can be designed to provide high-pressure injection of glycol. The HPTU 96 can also include an HPTU skid, a computerized pump controller, a motor starter panel, a BOP/test storage area remote panel, and a rig floor panel. The system can be designed to be able to supply fluid in a controlled, safe, and properly isolated manner.

In some embodiments, a pod tester 98 can be used with a laptop portable computer that is furnished with the system. The software in the pod tester 98 can allow an operator to test and monitor any function, analog value point, or flow meter reading in the subsea pods of the BOP control system 10 while on a test stand. The software can also monitor analog reference points in the monitored subsea pod. Each regulator may also be operated by increase or decrease commands. The flow meter readings can be displayed, and may be reset with screen buttons on the pod tester 98 screen. In addition, a visual display screen can display the status of each solenoid, and can display the analog values for the analog reference points and flow meter readings. The software of the pod tester 98 can monitor analog transducers, monitor flow meters, operate regulators, and exercise individual solenoids.

Data Playback System—FIGS. 3-6

The abovedescribed systems of a BOP can produce a large amount of data over the course of operation. The data may be of many types. For example, the data may include various measurements such as pressure, temperature, flow rate, riser angles, current, voltage, ground faults, depth, impedance, frequency, any of the abovedescribed measurements, among others. Such measurements may be made at various different components and locations of the BOP. The data may also include various triggers, events, alarms, positions of valves, states of various equipment, and the like. For illustrative purposes, such events may include emergency disconnect sequences, diverter packer close sequences, testing sequences, wellbore leaks, different pressures across rams, retracting stabs under pressure, and changes in component performance. When such an event occurs, operators want to obtain information about the factors that may have lead up to the event or occurred as a result of the event, so as to be able to improve future operations.

Such information may be recorded over the course of operation, and stored in a database. In some embodiments, the data stored in the database may include raw measurements made by sensing devices instrumented on the BOP. Some data stored in the database may have undergone various processing. For example, some data may be obtained through applying functions/algorithms to various other data.

The data stored in the database may be accessed at a later time to generate visual playback of various data in a single visual field over the course of a selected time range. This may reveal new insights into the operation and function of the BOP system that can be used to make design or operational improvements. This may reveal correlations or causations between different aspects of the BOP operation that had not been previously known. For example, a false alarm may have occurred, but the cause of the alarm is unknown. Being able to playback multiple data variables from the BOP may help determine the root cause of the alarm. With enough such observations, the BOP/alarm reporting protocol or other parameters may be updated to reduce such false alarms and improve performance.

A subsea oil and gas operation analysis system may include a blowout preventer such as that described in FIGS. 1, 2A and 2B. Other types of BOPs may be utilized as well and not limited to that particular examples presented in the present application. The BOP may be instrumented with a plurality of sensing devices, the sensing devices generating respective measurements over time. Some sensing device may have alert triggering mechanisms or are coupled to processors with such mechanisms. Some sensing devices may be passive sensors that output data. The system includes a database which may be located on premise at the rig site or in another location remote from the rig site such as a designated server site. The measurements from the sensing devices or data derived therefrom may be stored in the database. The database may be accessible by machines (e.g., computers) at the rig site or remotely from the rig site. The machine includes at least a display, a processor, and user input device. A user interface is provided via the display, through which one or more user inputs are received.

Figure 3:
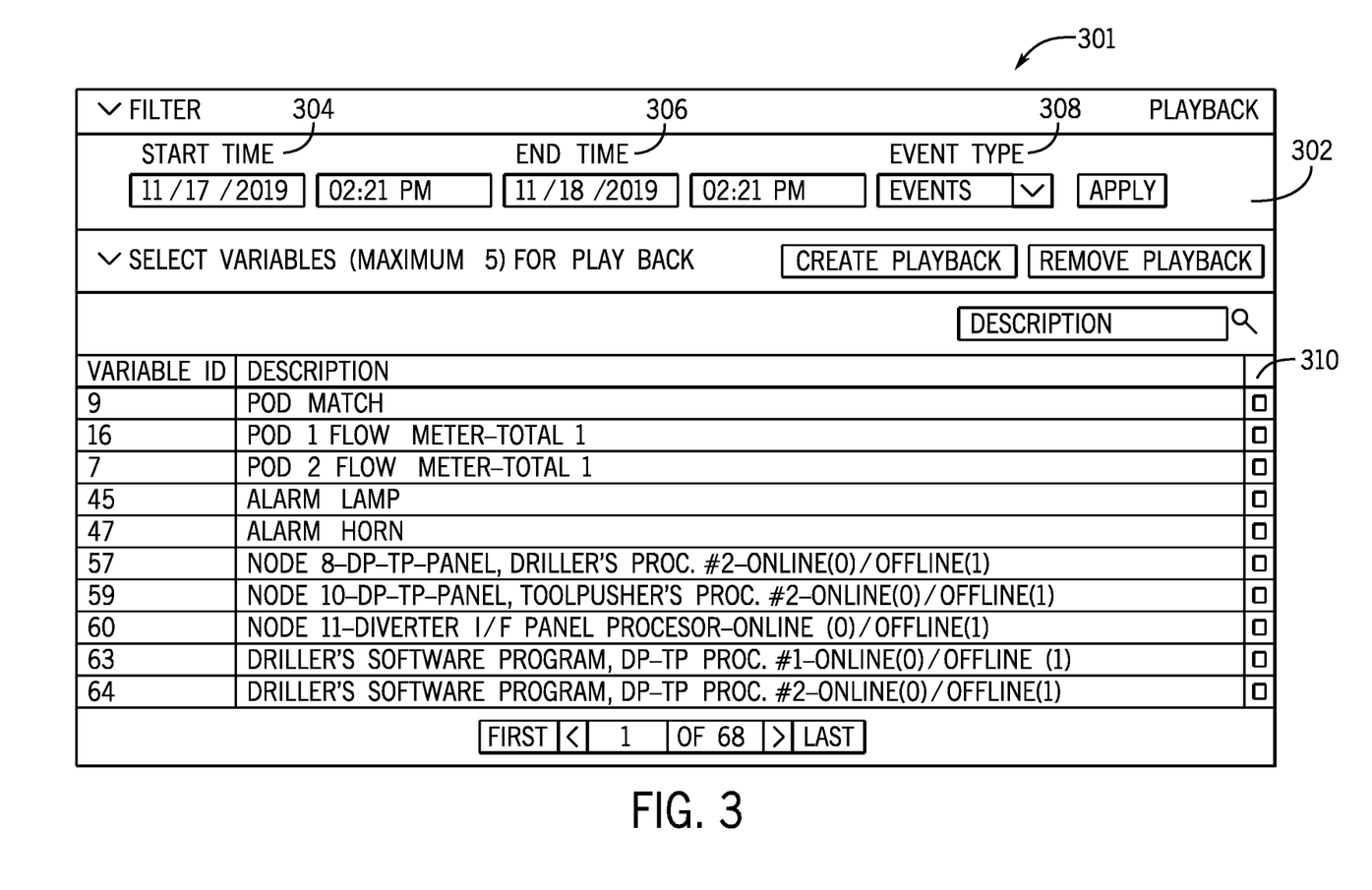
FIG. 3 illustrates an example portion of an interface of a data playback system for receiving use inputs, in accordance with example embodiments.

FIG. 3 illustrates an example portion of the interface 301 through which one or more user inputs may be received, in accordance with example embodiments. In the illustrated embodiment, the interface includes an input field for a time range 302, wherein the user can select a start time 304 and an end time 306 thereby defining a time range. The user may also, or instead, select an event 308 to investigate. The event may be associated with a predefined time range. Thus the user may not need to provide a time range, as the time range corresponding to the event is automatically determined and set.

The user interface 301 further includes a list of data variables 310 that the user can select from. In some embodiments, the user may be able to make a selection that has a group of predefined data variables. For example, the user may select a certain subsystem of the BOP, and a group of data variables associated with that subsystem is automatically included. Similarly, the user may select an event 308, such as described above with respect to the time range, and one or more data variables related to the event is automatically included. Thus, one or more data variables for the playback may be determined based on the user input, whether the user input is a custom selection of data variables, a predefined grouping of variables, or an event that is associated with one or more data variables. Ultimately, a time range and one or more data variables are determined based on the user input, and set. Thus, the respective values of the one or more data variables corresponding to the time range are obtained from the database. A visual representation of the values of the one or more data variables corresponding to the time range is displayed.

Figure 4:
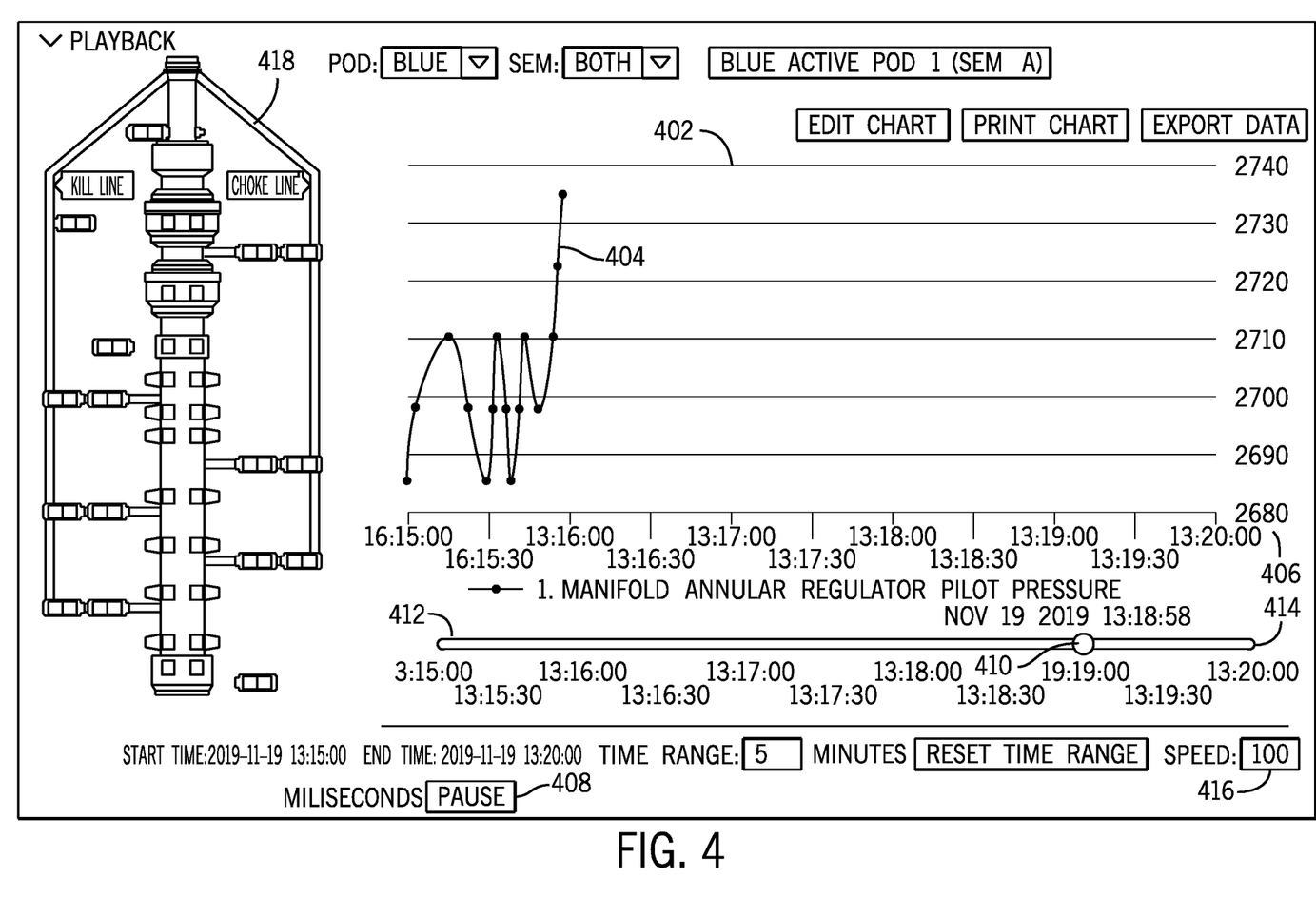
FIG. 4 illustrates an example portion of an interface of a data playback system for displaying playback data, in accordance with example embodiments.

FIG. 4 illustrates an interface 401 providing a visual representation 402 of the values 404 of the one or more data variables corresponding to the time range, with respect to time 406, in accordance with example embodiments. Different data variables may be displayed in different formats, depending on the data type. Some data variables may be displayed graphically, in one or more graph types. Some data variables may be presented in other data visualization formats such as, but not limited to, heat maps, processed imaging, histograms, scatter plots, line charts, and the like. In some embodiments, multiple data variables may be presented in a multiple variable graph. The overall visual representation of the selected data variables may be automatically optimized based on the type of data variables, the event type, among other possible criteria. For example, it may be more informative to place certain data variables side by side, or superimposed, or positioned/aligned is various ways in order to best show any potential correlations or otherwise facilitate comparisons and ease of understanding.

The visual representation 402 is dynamic can play like a movie with respect to time, sequentially generating the data over the duration of the time range. Playback of the values of the one or more data variables may be controlled via received user manipulation of a data playback control element 408. For example, playback may be controlled by the user through a play/pause button 410. The playback can also be manually controlled, in which a particular time within the time range is selected and the visual representation of the data variables reflects the data at the selected time. For example, the data playback control element may include a slider 410 movable between the start 412 of the selected time range and the end 414 of the time range, and playback or position of the values of the data variables is depends on the position of the slider 410. The user may drag the slider to see the corresponding playback. The user may drag the slider 410 or click on a particular position to place the slider at a particular time, and the visual representation will display the corresponding data or playback position. In some embodiments, one or more additional adjustable settings 416 may be available, such as the playback speed.

In some embodiments, the values of the data variables are synchronized with respect to time. Alternatively, the visual representation of the data variables may be independently controlled such that some may be controlled to advance while keeping others paused.

In some embodiments, the interface may provide a representation of one or more relevant components of the BOP 418 to further illustrate events and states of the BOP corresponding to the time range.

Figure 5:
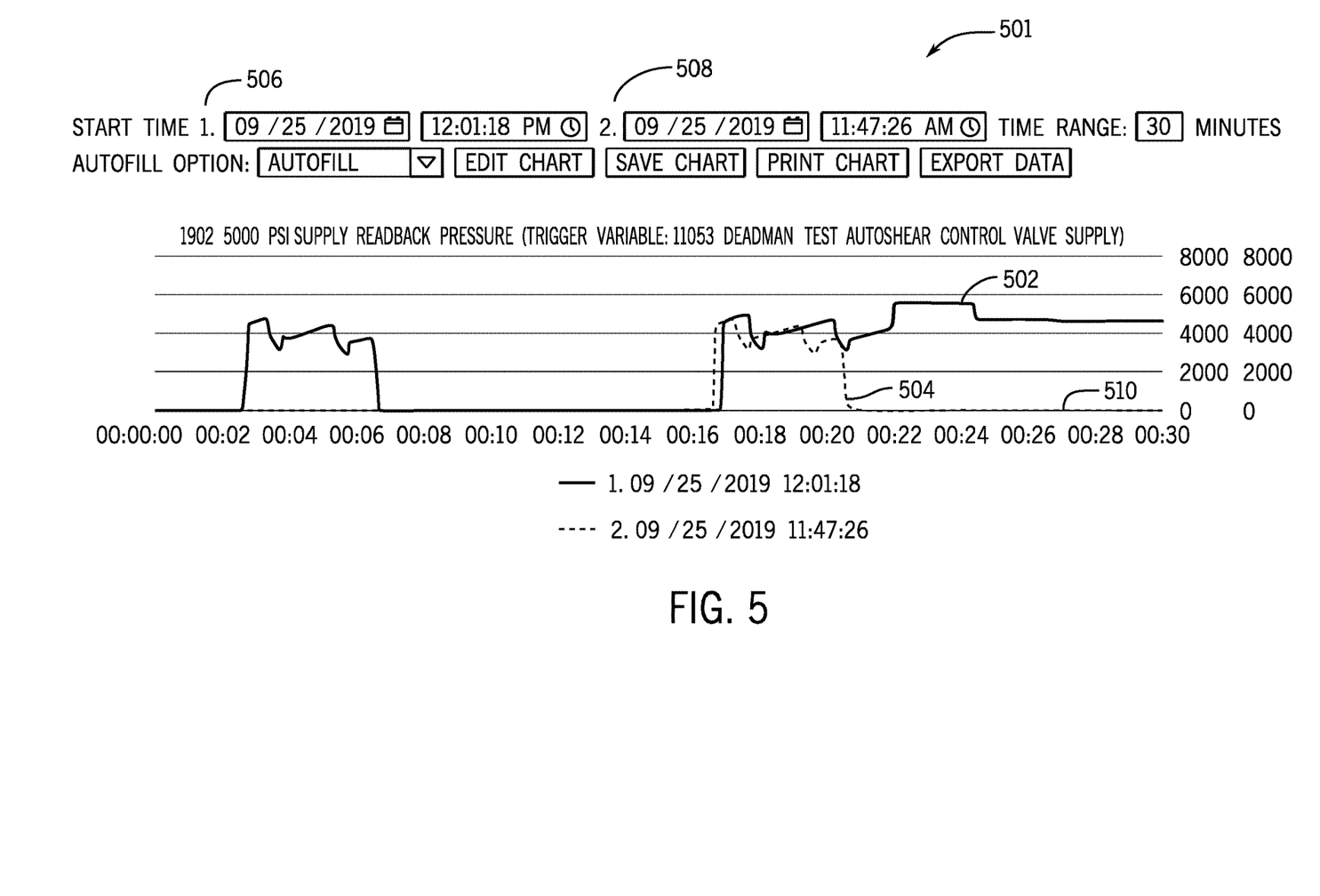
FIG. 5 illustrates an example portion of an interface of a data playback system for displaying playback data from two time ranges, in accordance with example embodiments.

In some embodiments, the data from more than one time range may be concurrently displayed and played back. FIG. 5 illustrates a visual representation 501 of the data 502, 504 from two time ranges 506, 508 (respectively) displayed together, in accordance with example embodiments. In some embodiments, the two time ranges have the same duration but different start times. In some embodiments, the time axis 510 is defined by seconds (or other magnitude of time) since the start time and can thus be a shared axis. In some embodiments, two time axis may be provided showing the two time stamps. Similarly, the value axis 502 may be shared, or two value axis may be provided (as shown).

This provides additional information by enabling visual comparison of what was happening at different but comparable times. For example, the data from a plurality of occurrences of a particular type of event may be analyzed in this fashion. In such embodiments, a second time range based on the one or more user inputs, which may be in the form of an explicit time range selection or the selection of an event that is associated with a certain time range. Respective values of the selected data variables corresponding to the second time range are obtained from the database, and a visual representation 501 of the values of the selected data variables corresponding to the second time range is generated. In some embodiments, the visual representation of the values of the selected data variables corresponding to the second time range is stacked or otherwise positioned with respect to the visual representation of the values of the selected variables corresponding to the first/other time range. In some embodiments, the values for the same variable may be superimposed.

Figure 6:
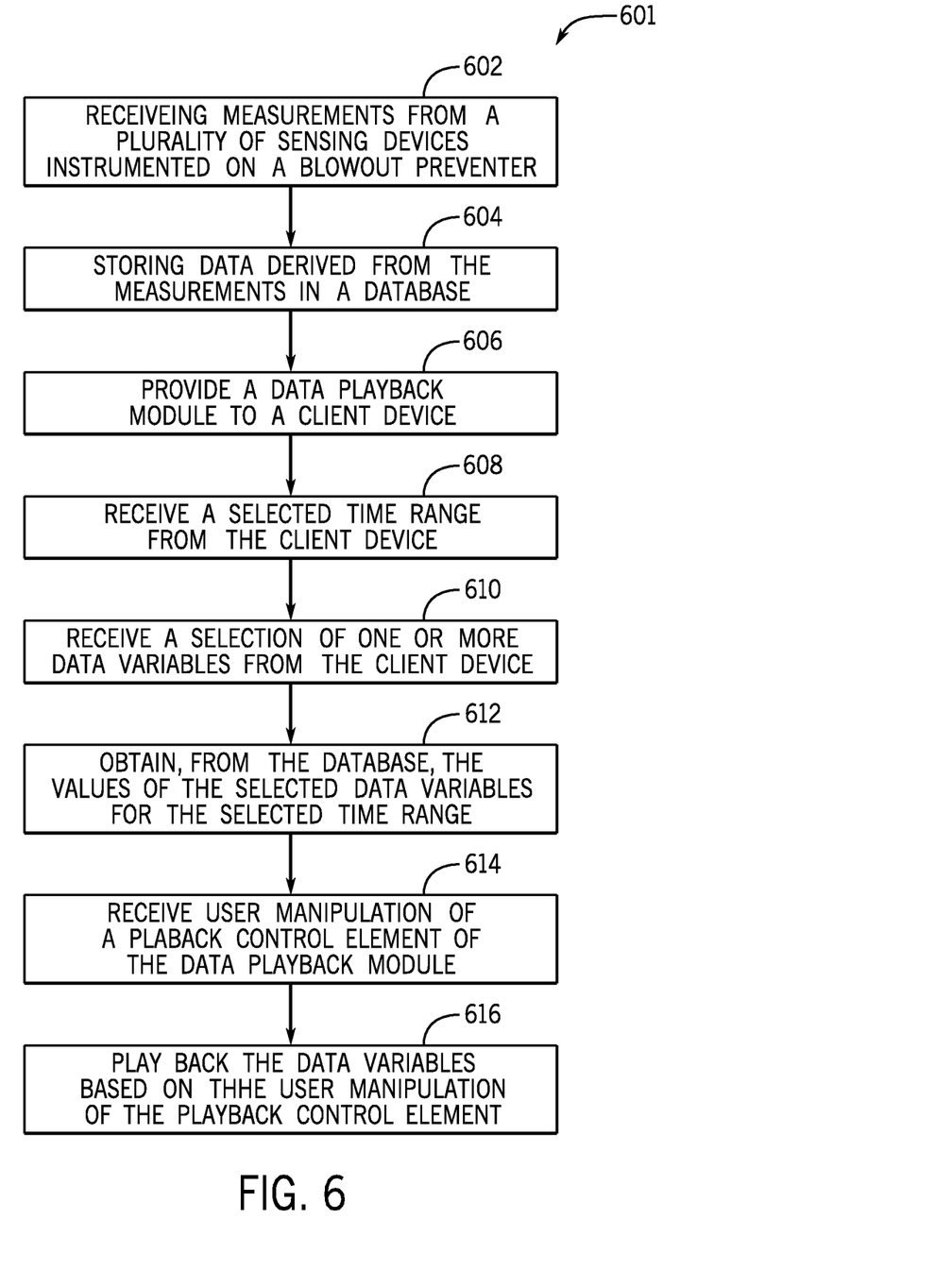
FIG. 6 illustrates a flowchart of a method for subsea oil and gas operation analysis, in accordance with example embodiments.

FIG. 6 illustrates a flowchart of a method 601 for subsea oil and gas operation analysis, in accordance with example embodiments. The steps set forth may be performed in any order and are not limited to being performed in the order presented below. Other embodiments may include additional or fewer steps than those set forth below. In this example, the method includes receiving (602 measurements from a plurality of sensing devices instrumented on a blowout preventer. The measurements are generated by the plurality of sensing devices over time. The measurements or data derived from the measurements are stored (604) in a database. A data playback module is provided (606) to a client device. The data playback module may be dynamically served to the client device via an internet connection or it may be provided as on-device software installed on the client device. The data playback module includes a time range selector, a data variable selector, and a data playback control element. A time range entered into the time range selector is received (608). In some embodiments, in lieu of a time range, an event selection may be received, and a time range may be automatically determined based on the selected event.

The method further includes receiving (610) one or more data variables selected from a plurality of data variables at the data variable selector. Similarly, the data variables may be determined automatically based on a selected event. Respective values of the selected data variables corresponding to the time range is then obtained (612) from the database. A visual representation of the values of the one or more data variables corresponding to the time range is generated and ready for playback. The visual representation provides playback of the values of the one or more data variables synchronized with respect to time. The method further includes receiving (614) user manipulation of the data playback control element, which controls playback of the values. Accordingly, the values in the visual representation are progressively displayed (616) or played back based on the manipulation of the data playback control element.

While the present disclosure has been described with respect to a limited number of embodiments, those skilled in the art, having benefit of this disclosure, can appreciate that other embodiments may be devised which do not depart from the scope of the disclosure as described herein. Accordingly, the scope of the disclosure should be limited only by the attached claims.

What is claimed is:

1. A subsea oil and gas operation analysis system, comprising:
   a blowout preventer instrumented with a plurality of sensing devices, the sensing devices generating respective measurements over time;
   a database storing data obtained from the measurements;
   a display comprising a user interface;
   at least one processing device having access to instructions that, when executed by the at least one processing device, cause the system to:
      receive the data via the user interface, wherein the data is associated with multiple events having a selected event type;
      determine a time range for each of the multiple events based on the selected event type;
      determine a data variable based on the selected event type;
      obtain, from the database, respective values of the data variable corresponding to the time range for each of the multiple events;
      generate, on the display, a visual representation of the values corresponding to the time range for each of the multiple events, the visual representation providing playback of the values synchronized with respect to time,
         wherein the visual representation of the values includes respective graphs of the data variable for each of the multiple events superimposed with each other,
         wherein the time range for each of the multiple events is graphed by duration from a start time along a shared time axis, and
         wherein the playback of the values includes sequentially displaying the values over the time range; and
      provide, via the display, a data playback control element, wherein playback of the values of the data variable is controlled manually or automatically via user manipulation of the data playback control element,
         wherein playback of the values is independently controlled by the position of the data playback control element, such that the values corresponding with a first event of the multiple events are controllable to advance while the values of a second event of the multiple events are kept paused.

2. The system of claim 1, wherein the time range of the selected event type is predefined.

3. The system of claim 1, wherein the event type is selected from the group consisting of emergency disconnect sequences, diverter packer close sequences, testing sequences, wellbore leaks, different pressures across rams, retracting stabs under pressure, and changes in component performance.

4. The system of claim 1, wherein the values are calculated based on measurements generated by at least some of the plurality of sensing devices.

5. The system of claim 1, wherein the data playback control element includes a slider manually movable between a beginning of the shared time axis and an end of the shared time axis.

6. The system of claim 1, wherein the data variable includes one or more of a state of a component of the blowout preventer, a state of an operation, or a sensor measurement.

7. The system of claim 6, wherein the sensor measurements comprise one or more selected from the group consisting of flow rate, riser angles, current, voltage, ground faults, depth, impedance, and frequency.

8. The system of claim 1, wherein the visual representation of the values includes graphs of the data variable comprising one or more graph type selected from the group consisting of heat maps, processed imaging, histograms, scatter plots, and line charts.

9. A subsea oil and gas operation analysis system, comprising:
   a database storing data generated based on measurements made by a plurality of sensing devices implements on a blowout preventer;
   a display comprising a user interface;
   at least one processing device having access to instructions that, when executed by the at least one processing device, cause the system to:
      receive the data via the user interface, wherein the data is associated with multiple events having a selected event type;
      determine a time range for each of the multiple events based on the selected event type;
      determine a data variable based on the selected event type;
      obtain, from the database, respective values of the data variable corresponding to the time range for each of the multiple events;
      generate, on the display, a visual representation of the values corresponding to the time range for each of the multiple events, the visual representation providing playback of the values synchronized with respect to time,
         wherein the visual representation of the values includes respective graphs of the data variable for each of the multiple events superimposed with each other, wherein the time range for each of the multiple events is graphed by duration from a start time along a shared time axis, and
         wherein playback of the visual representation sequentially displays the values of the data variable over the time range; and
      provide, via the display, a data playback control element, wherein the playback of the values of the data variable is controlled manually or automatically via user manipulation of the data playback control element, wherein playback of the values is independently controlled by the position of the data playback control element, such that the values corresponding with a first event of the multiple events are controllable to advance while the values of a second event of the multiple events are kept paused.

10. The system of claim 9, wherein the event type is selected from the group consisting of emergency disconnect sequences, diverter packer close sequences, testing sequences, wellbore leaks, different pressures across rams, retracting stabs under pressure, and changes in component performance.

11. The system of claim 9, wherein the data variable includes one or more of a state of a component of the blowout preventer, a state of an operation, or a sensor measurement.

12. The system of claim 11, wherein the sensor measurements comprise one or more selected from the group consisting of pressure, temperature, flow rate, riser angles, current, voltage, ground faults, depth, impedance, and frequency.

13. The system of claim 9, wherein the visual representation of the values includes graphs of the data variable comprising one or more graph type selected from the group consisting of heat maps, processed imaging, histograms, scatter plots, and line charts.

14. A method for subsea oil and gas operation analysis, comprising:
receiving measurements from a plurality of sensing devices instrumented on a blowout preventer, the measurements generated by the plurality of sensing devices over time;
storing data generated based on the measurements in a database;
providing a data playback interface to a client device, wherein the data playback interface includes a data playback control element and the data, wherein the data is associated with multiple events having a selected event type;
determining a time range for each of the multiple events based on the selected event type;
determining a data variable selected from a plurality of data variables based on the selected event type;
retrieving, from the database, respective values of the data variable corresponding to the time range for each of the multiple events;
generating, on the display, a visual representation of the values corresponding to the time range for each of the multiple events, the visual representation providing playback of the values synchronized with respect to time,
wherein the visual representation of the values includes respective graphs of the data variable for each of the multiple events superimposed with each other,
wherein the time range for each of the multiple events is graphed by duration from a start time along a shared time axis, and
wherein the playback of the values includes sequentially displaying the values over the time range;
receiving user manipulation of the data playback control element, wherein the data playback control element is manually or automatically controlled; and
displaying the values according to the user manipulation, wherein playback of the values is independently controlled by the position of the data playback control element, such that the values corresponding with a first event of the multiple events are controllable to advance while the values of a second event of the multiple events are kept paused.

15. The method of claim 14, further comprising:
receiving the start time and an end time entered into the user interface; and
determining the time range based on the start time and the end time.

16. The method of claim 14, wherein the event type is selected from the group consisting of emergency disconnect sequences, diverter packer close sequences, testing sequences, wellbore leaks, different pressures across rams, retracting stabs under pressure, and changes in component performance.

17. The method of claim 14, wherein the visual representation of the values includes respective graphs of the data variable comprises one or more graph type selected from the group consisting of heat maps, processed imaging, histograms, scatter plots, and line charts.

* * * * *